US007247326B2

(12) United States Patent  
Södergård

(10) Patent No.: US 7,247,326 B2  
(45) Date of Patent: Jul. 24, 2007

(54) BIODEGRADABLE GUM BASE

(75) Inventor: Anders Södergård, Groningen (NL)

(73) Assignee: Tate & Lyle Public Limited Company, London (GB)

( * ) Notice: Subject to any disclaimer, the term of this patent is extended or adjusted under 35 U.S.C. 154(b) by 473 days.

(21) Appl. No.: 10/473,085

(22) PCT Filed: Mar. 27, 2002

(86) PCT No.: PCT/NL02/00199

§ 371 (c)(1), (2), (4) Date: Sep. 26, 2003

(87) PCT Pub. No.: WO02/076232

PCT Pub. Date: Oct. 3, 2002

(65) Prior Publication Data

US 2004/0091573 A1 May 13, 2004

(30) Foreign Application Priority Data

Mar. 28, 2001 (EP) .................................. 01201162

(51) Int. Cl.  
*A23G 4/08* (2006.01)

(52) U.S. Cl. ............................................. 426/6; 426/3
(58) Field of Classification Search .................. 426/3, 426/6  
See application file for complete search history.

(56) References Cited

U.S. PATENT DOCUMENTS

| 4,405,647 | A | * | 9/1983 | Fisher et al. ................ 426/4 |
| 5,672,367 | A | * | 9/1997 | Grijpma et al. .............. 426/6 |
| 6,153,231 | A | * | 11/2000 | Li et al. ..................... 426/6 |

FOREIGN PATENT DOCUMENTS

| EP | 0 711 506 A2 | 5/1996 |
| EP | 0 882 751 A2 | 12/1998 |
| EP | 0 882 751 A3 | 2/1999 |
| EP | 0 711 506 A3 | 10/1999 |
| WO | WO 00/19837 | 4/2000 |

* cited by examiner

*Primary Examiner*—Arthur L. Corbin  
(74) *Attorney, Agent, or Firm*—Williams, Morgan & Amerson, P.C.

(57) ABSTRACT

The invention is directed to a chewing gum, including a gum base and at least one other conventional chewing gum component, said chewing gum including as gum base at least one branched polymer mainly based on biodegradable and/or hydrolyzable ester groups.

12 Claims, No Drawings

BIODEGRADABLE GUM BASE

TECHNICAL FIELD OF THE INVENTION

This invention relates to a chewing gum containing a gum base and/or additives from biodegradable resources showing improved chewability with regard to earlier described formulations based on biodegradable polymers.

DESCRIPTION OF RELATED ART

It is known that chewing gum formulations can be made from biodegradable, environmentally more acceptable polymers than the conventional non-biodegradable polymers used as gum base in chewing gums. Examples of this have been described in, for instance, U.S. Pat. No. 5,672,367 and EPO 711 506 A2, where aliphatic polyesters were used, in U.S. Pat. No. 6,153,231, where oxazoline or urethane consisting copolymers of poly(lactic acid) were disclosed, and in WO-A-99/39588, where bacterial polyhydroxyalkanoates having side chains of $C_4$ to $C_{30}$ were used in chewing gum formulations.

A further example of chewing gums containing biodegradable gum bases prepared from aliphatic polyesters is described in WO-A-00/19837.

These disclosed gum bases based on poly(D,L-lactic acid) and copolymers thereof do, however, have need of plasticizing agents in order to obtain the softness and chewability required in a gum base. Furthermore, a glass transition temperature of 35.8° C. is presented for a pure poly(D,L-lactic acid) with a viscosity-average molar mass of 42 200 g/mol. It is apparent that a pure poly(D,L-lactic acid) of this molar mass, without any kind of plasticizing component present, cannot show a softening temperature that low, as it is commonly known that these kind of polymers have a glass transition temperature higher than that.

EPO 882 751 discloses a method for preparing a biodegradable aliphatic polyester in the presence of minute amounts of co-catalysts comprising glycerol or butyrolactone. The polyester prepared showed lower melt viscosities than a polymer prepared without the co-catalyst at the preferred molding temperatures around 180° C.

SUMMARY OF THE INVENTION

In the present invention, however, the gum base is based on branched or star-shaped polymers with several polyester branches or arms attached to a central polyfunctional compound, thus, surprisingly, resulting in a gum base having improved softness and chewability. Further improvements in the current invention are the use of certain starting compounds or preparation conditions giving the final chewing gum additional functional properties.

The present invention relates to a degradable gum base, where special properties are achieved by the choice of starting compounds and/or preparation conditions during the synthesis of the polymer or during post-polymerization processing.

DETAILED DESCRIPTION OF PREFERRED EMBODIMENTS

The polymers used according to the present invention are branched polymers with several polyester branches or arms polymerized onto a polyfunctional compound with desired properties, as schematically shown in Formula (I).

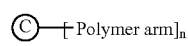
(I)

wherein,
C=central polyfunctional; and
n=polymer arms attached to C.

A polymer according to the invention can be prepared from the ring-like ester, such as L,L-lactide, D,D-lactide, rac-lactide, meso-lactide or mixtures thereof, glycolide, trimethylene carbonate, lactones, such as β-propiolactone, δ-valerolactone, ε-caprolactone, or other corresponding cyclic compound like cyclic amides. In one embodiment, the cyclic amide comprises caprolactam. The polymer can also be prepared by condensation reaction from a hydroxy acid, such as lactic acid, glycolic acid, amino acids, or from monomeric units of diols and diacids. Such a polymer can for instance be used in the form of block copolymers, random copolymers, graft-copolymers, or as mixtures of two or more homo- and/or copolymers. The invention can be described as a concept where the starting compounds in the polymerization will affect a larger number of different properties, of which some are described below:

1. The initiator determines the structure of the polymer, i.e. the degree of branching, which reflects on the viscoelastic properties of the gum base, which in turn determines the chewing properties of the chewing gum (examples on such compounds are decanol, pentaerythritol, dipentaerythritol).
2. The type of starting materials used can have an impact on other properties related to the performance and appearance of the chewing gum. Examples on such properties are the sweetening effect, compatibility with other ingredients, and taste retention (examples on such compounds are decanol, sorbitol, inositol).
3. The choice of starting material and/or preparation conditions or post-polymerization processing may offer benefits in the view of health aspects for instance by equipping the gum base with for instance antibacterial effect (lactic acid and lactones are known antibacterial substances) or other effects (examples on such compounds are lactones, xylitol, organic acids, hydroxylapatit).
4. The starting material, ways of preparation and processing conditions have a significant impact on the hydrolytic stability of the polymer used in the gum base, which will affect the compostability and enable the removal of undesired chewing gum from, for example, clothes, furniture, streets, and floors. Degradation enhancing compounds can be compounds increasing the hydrofilicity (for instance anhydrides or carboxylic acid compounds) or compounds catalyzing the rate of hydrolysis (for instance amino or amido compounds).

The polyfunctional compounds according to present invention typically contain three or more hydroxyl groups, such as trimethylolethane, trimethylolpropane, butanetriol, phloroglucinol, erythritol, pentaerythritol, or dipentaerythritol. Naturally occurring polyfunctional compounds of sugars of mono-, di-, or trisaccharides of hexoses or pentoses, or maltitol, sorbitol, mannitol, xylitol, inositol, or such, can optionally be used. The polyfunctional compound can be used alone or in any combination with other homo- or polyfunctional compounds. It should, however, be understood that current invention should not be limited to the few polyfunctional compounds mentioned as examples herein, but should be considered in a broader sense within the spirit and scope of present invention. For a person skilled in the art it will be apparent that, for instance, the polyfunctional compound does not have to be a hydroxyl containing compound, but can also consist of other initiating species, such as, for example, amino groups.

In a preferred embodiment of the current invention a star-shaped copolymer or block copolymer of a lactide and one or more other cyclic esters, such as glycolide, trimethylene carbonate, lactones such as β-propiolactone, δ-valerolactone, ε-caprolactone, or lactones of larger size, or a mixture of two or more polymers, with at least one polymer containing lactide, is used in the gum base. Preferably a system containing at least 50 mol % lactide, more particularly at least 65 mol % lactide, is used.

The polymerization can be done by any conventional polymerization technique, such as, for example, polymerization in bulk or solution, generally in the presence of a suitable polymerization catalyst.

A chewing gum typically consists of a water-soluble bulk part, a water-insoluble gum base, and flavoring components. The water-soluble part of the chewing gum comprises of, for example plasticizers, sweeteners and combinations thereof. Plasticizers, such as glycerin, lecithin and combinations thereof, are conventionally added for improving the softness and chewability of the water-insoluble gum base. It was, however, surprisingly noticed that in the current invention usage of plasticizers are not necessary in order to obtain the chewability and mouthfeel required in chewing gums. Plasticizers may optionally be used in the gum base formulations described herein.

The water-soluble sweeteners consists of, for example, saccharide containing components conventionally used in chewing gum, dried invert sugar, sucrose, dextrose, maltose, fructose, levulose, galactose and the like, alone or in combination with other sweeteners. Sugarless sweeteners, including, for instance, sugar alcohols such as sorbitol, mannitol, xylitol, maltitol, hydrogenated starch hydrolysates and the like, are also commonly used, alone or in combination with other sweeteners. Other typical sweeteners, such as, for example, aspartame, acesulfame, and saccharide, can be used alone or in combination.

A chewing gum can further contain about 0.1 to 10% flavoring components. The flavoring components may include, for example, oils from plants and fruits, such as citrus oil, fruit extracts, peppermint oil, spearmint oil, clove oil, aniseed oil, alone or as mixtures with other flavor inducing agents.

Furthermore, fillers, such as magnesium and calcium carbonate, kaolin, tricalcium phosphate, talc, wood fiber, apple fiber, zein, gluten, casein, can optionally be added to the chewing gum. Natural organic fillers are preferably used in current invention.

Additional components, such as colorants, medical components, mouth conditioners, and antioxidants, can also be added to the chewing gum, either during the polymerization or afterwards.

By no way of limiting the present invention, explanatory examples will be given in the following. Standard laboratory procedures were used in all chemical handling, purification, drying and synthesis. Calculations known in the art for obtaining a polymer of a certain number-average molar mass and/or copolymer composition were used. The polymerization experiments were performed under an inert atmosphere in an electrically heated Brabender W 50 E mixer, unless otherwise stated. Usual polymerization conditions were as follows:

Polymerization temperature: 140-170° C.
Polymerization time: 30-240 min
Rotation speed of the mixer: 15 rpm
0.05 wt % stannous 2-ethylhexanoate was used as catalyst
Amount of monomers and initiators were varied, depending on the calculated number-average molar mass and/or copolymer composition of the resulting polymers, so that total amount put in the mixer was 40 g.

A GPC (Gel Permeation Chromatography) apparatus was used for molar mass measurements. The monomer conversion, number-average molar mass, and copolymer composition were determined by NMR technique. Differential Scanning Calorimetry (DSC) was used for measuring the thermal properties, e.g. the glass transition temperature ($T_g$).

EXAMPLE 1

An amorphous, non-crystallizable copolymer of (50/50) rac-lactide was prepared by ring-opening polymerization in the melt by using different hydroxyl compounds as initiators. The initiators and some polymer properties are listed in Table 1.

TABLE 1

Examples on different initiators in the preparation of gum bases based on rac-lactide.

| Experiment No | Initiator | $M_w$ g/mol | $M_n$ g/mol | $T_g$ ° C. |
|---|---|---|---|---|
| 1 | 1-Decanol | 33 500 | 20 000 | 44 |
| 2 | Phloroglucinol | 33 800 | 19 900 | 49 |
| 3 | Inositol | 16 400 | 12 600 | 44 |
| 4 | Dipentaerythritol | 21 600 | 18 300 | 43 |

EXAMPLE 2

Star-shaped copolymers of lactide and ε-caprolactone were prepared by ring-opening polymerization in the melt by using a star-shaped poly(ε-caprolactone) with pentaerythritol core as macroinitiator. The star-shaped polymeric gum bases, with no components added, showed a chew feel similar to the one of a conventional commercially available chewing gum. The conditions during the experiments and the results from the series are shown in Table 2.

TABLE 2

Examples on gum bases consisting of branched copolymers of lactide and ε-caprolactone.

| Experiment No | Lactide | ε-CL/Lactide ratio | $M_w$ g/mol | $M_n$ g/mol | $T_g$ ° C. |
|---|---|---|---|---|---|
| 5 | Rac | 37/63 | 29 600 | 25 900 | −20 |
| 6 | L, L | 42/58 | 26 400 | 23 900 | —*⁾ |
| 7 | Rac | 54/46 | 19 300 | 17 200 **⁾ | −23 |
| 8 | Rac | 32/68 | 43 700 | 32 600 *⁾ | −13 |
| 9 | Rac | 22/78 | 67 500 | 43 000 **⁾ | +2 |

*⁾ Not detected; DSC showed $T_m$ = 150° C., ΔH = 33 J/g
**⁾ Based on NMR

EXAMPLE 3

Star-shaped random copolymers consisting of ε-caprolactone and (50/50)rac-lactide was prepared by ring-opening polymerization, initiated by pentaerythritol, in the melt. The polymer characteristics are presented in Table 3.

TABLE 3

Examples on gum bases consisiting of branched random copolymers of rac-lactide and ε-caprolactone.

| Experiment No | ε-CL/Lactide ratio | $M_n$ g/mol *) | $M_w/M_n$ | $T_g$ ° C. |
|---|---|---|---|---|
| 10 | 3/97 | 17 500 | 1.34 | +45 |
| 11 | 8/92 | 16 700 | 1.35 | +40 |
| 12 | 14/86 | 15 800 | 1.42 | +35 |

*) Based on NMR

EXAMPLE 4

800 g 88% L-lactic acid was dried and condensation polymerized in the presence of 0.2 wt % tin(II) oxide at 180° C. in a standard laboratory rotary evaporator unit under reduced pressure and argon flow until the poly(L-lactic acid) had a $M_n$ of 1 900 g/mol ($M_w/M_n$=3.12). The poly(L-lactic acid) was then further linked with 96 g of a hydroxyl-terminated star-shaped poly(ε-caprolactone) with a pentaerythritol core at 195° C. (p=5 mbar) in the laboratory rotary evaporator unit, resulting in a star-shaped copolymer with $M_n$=7 400 g/mol. DSC showed a $T_g$=−22° C. and $T_m$=130° C.

EXAMPLE 5

800 g of 88% L-lactic acid was dried and condensation polymerized in the presence of 20 g succinic acid and 0.1 wt % stannous 2-ethylhexanoate at 180° C. in a standard laboratory rotary evaporator unit under reduced pressure until the poly(L-lactic acid) had a $M_w$ of 3 800 g/mol. 40 g of the brittle poly(L-lactic acid) was further linked with 40 g of a hydroxyl-terminated star-shaped poly(ε-caprolactone) with a pentaerythritol core at 180° C. (p=25 mbar) in the laboratory rotary evaporator unit until the resulting soft star-shaped multi-branched copolymer reached a $M_w$=40 600 g/mol.

EXAMPLE 6

88% D,L-lactic acid was dried and condensation polymerized in the presence of 0.1 wt % stannous 2-ethylhexanoate at 180° C. in a standard laboratory rotary evaporator unit under reduced pressure until the poly(D,L-lactic acid) had a $M_w$ of 3 000 g/mol ($M_w/M_n$=2.70). The brittle poly (D,L-lactic acid) was further linked with 117.0 g of a hydroxyl-terminated star-shaped poly(ε-caprolactone) with a pentaerythritol core at 180° C. (p=23 mbar) in the laboratory rotary evaporator unit, resulting in a star-shaped copolymer with $M_w$=8 500 g/mol. Without the addition of any plasticizing agents this soft copolymer showed a $T_g$ of 6° C., as determined by DSC.

EXAMPLE 7

Star-shaped random copolymers consisting of ε-caprolactone and (50/50) rac-lactide were prepared by ring-opening polymerization, initiated by pentaerythritol, in the melt. The amount of residual lactide available for hydrolysis (eventually into lactic acid) could be determined by the choice of polymerization time (Table 4).

TABLE 4

The amount of residual lactide as a function of polymerization time.

| Experiment No *) | Residual lactide at different polymerization times mol % **) | | |
|---|---|---|---|
| | 30 min | 60 min | 90 min |
| 10 | 7.0 | 5.6 | 3.6 |
| 11 | 10.7 | 3.9 | 2.7 |
| 12 | 4.3 | 2.4 | 1.8 |

*) Experiment no. from Example 3; **) Based on NMR

EXAMPLE 8

A star-shaped copolymer of rac-lactide and ε-caprolactone was prepared in the same manner as in Example 2 and the gum base was tested for rheological properties. The gum base, with no components added, showed rheological properties comparable to a conventional gum base.

While the invention has been described in detail with respect to specific preferred embodiments thereof, it will be appreciated that those skilled in the art, upon a reading and understanding of the foregoing will readily envision modifications and variations to the preferred embodiments which are nonetheless within the spirit and scope of the invention and of the claims.

The invention claimed is:

1. A chewing gum, comprising a gum base and at least one other conventional chewing gum component, said gum base comprising at least one branched polymer including at least one of biodegradable and hydrolyzable ester groups, wherein the branched polymer is either based on at least one cyclic ester, cyclic carbonate or cyclic amide by ring-opening polymerization or is made from at least one of diol/diacid combinations, hydroxy acids and amino acids by polycondensation.

2. The chewing gum of claim 1, wherein said at least one branched polymer comprises a star-shaped biodegradable polymer with a plurality of branches attached to a central polyfunctional compound.

3. The chewing gum of claim 2, wherein the polyfunctional compound comprises at least one compound having at least 3 hydroxyl or amino groups.

4. The chewing gum of claim 1, wherein starting compounds of the chewing gum impact at least one function of the chewing gum, said function comprising at least one of softening temperature, viscoelasticity, taste, compatibility and degradability.

5. The chewing gum of claim 1, wherein the at least one branched polymer is prepared using processing conditions that impact at least one function of the chewing gum, said function comprising at least one of softening temperature, viscoelasticity, taste, compatibility and degradability.

6. The chewing gum of claim 1, wherein said cyclic ester comprises at least one of L,L-lactide, D,D-lactide, rac-lactide, meso-lactide, ε-caprolactone and glycolide.

7. The chewing gum of claim 1, wherein said cyclic carbonate comprises trimethylene carbonate.

8. The chewing gum of claim 1, wherein said cyclic amide comprises caprolactam.

9. The chewing gum of claim 1, wherein the hydroxy acid comprises at least one of lactic acid and glycolic acid.

10. A chewing gum, comprising a gum base and at least one chewing gum additive, said chewing gum additive comprising at least one branched polymer including at least one of biodegradable and hydrolyzable ester groups, wherein the branched polymer is either based on at least one cyclic ester, cyclic carbonate or cyclic amide by ring-opening polymerization or is made from at least one of diol/diacid combinations, hydroxy acids and amino acids by polycondensation.

11. The chewing gum of claim 10, wherein the said at least one branched polymer comprises a star-shaped biodegradable polymer having a plurality of branches attached to a central polyfunctional compound.

12. The chewing gum of claim 11, wherein said polyfunctional compound is based on at least one compound having at least 3 hydroxyl or amino groups.

* * * * *